United States Patent
Powell

(10) Patent No.: US 6,228,198 B1
(45) Date of Patent: May 8, 2001

(54) METHOD OF AND APPARATUS FOR PRODUCING SINGLE WIRE BEADS FOR TIRES

(75) Inventor: Bernard William Powell, 1 Church Walk, Stourport-on-Severn Worcestershire DY13 0AL (GB)

(73) Assignees: A.R.T. (NL); Bernard William Powell (GB)

( * ) Notice: Subject to any disclaimer, the term of this patent is extended or adjusted under 35 U.S.C. 154(b) by 0 days.

(21) Appl. No.: 09/423,396

(22) PCT Filed: May 11, 1998

(86) PCT No.: PCT/GB98/01336

§ 371 Date: Nov. 8, 1999

§ 102(e) Date: Nov. 8, 1999

(87) PCT Pub. No.: WO98/51483

PCT Pub. Date: Nov. 19, 1998

(30) Foreign Application Priority Data

May 12, 1997 (GB) .................................................. 9709598

(51) Int. Cl.[7] .................................................. B29D 30/48
(52) U.S. Cl. ........................ 156/136; 156/259; 156/422
(58) Field of Search .................................. 156/136, 422, 156/162, 244.12, 247, 256, 259, 271; 245/1.5; 140/88

(56) References Cited

U.S. PATENT DOCUMENTS

| 1,100,451 | * | 6/1914 | Stevens | 156/422 |
|---|---|---|---|---|
| 1,923,699 | | 8/1933 | Andrews . | |
| 2,014,359 | | 9/1935 | Morrison . | |
| 2,902,083 | | 9/1959 | White . | |
| 5,385,621 | | 1/1995 | Golightly | 156/136 |
| 5,603,799 | | 2/1997 | Kolb et al. | 156/422 |

FOREIGN PATENT DOCUMENTS

| 0 532 778 | 3/1993 | (EP) . |
|---|---|---|
| 2 361 219 | 10/1998 | (FR) . |
| WO 92/11131 | 7/1992 | (WO) . |

* cited by examiner

Primary Examiner—Geoffrey L. Knable
(74) Attorney, Agent, or Firm—Howson and Howson

(57) ABSTRACT

A method of producing at least two single wire tyre bead cores comprising drawing off at least two bead wires from separate coils (20) of wires, passing the wires through wire processing means (23) to coat the drawn-off wires with rubber material, passing the rubber-coated wires through first festooner apparatus (24) and subsequently winding the rubber-coated wires on a former (36) to create at least two single wire tyre bead cores on the former. Before the wires are passed through the first festooner apparatus (24) they are joined together in the wire processing means (23). The joined together rubber coated wires are split (at 30) after passing through the first festooner apparatus (24) and, after being split, are passed through second festooner apparatus (31) before being wound on the former (36).

The invention also relates to apparatus for producing at least two single wire tyre bead cores.

3 Claims, 5 Drawing Sheets

METHOD OF AND APPARATUS FOR PRODUCING SINGLE WIRE BEADS FOR TIRES

This invention relates to a method of producing at the same time two or more single wire bead wire cores wound into a particular shape. In particular the method relates to the production of bead wire cores each having a plurality of convolutions, e.g. 70 or 80 convolutions, forming a bead wire core having a hexagonal section, for example as is used for a truck tyre. The invention also relates to an apparatus for producing such tyre bead cores.

Many tape or weftless bead lines are used to produce at the same time one, two or even three tyre bead cores for automobiles. To do so, a wire/compound tape is prepared at an extruder head of a width equivalent to the multiple width of the number of simultaneous bead wire cores to be produced. This single, but wide, tape is passed through a single pull-off drum and festooner system into a winding machine.

The tape is drawn into the winding machine and, if more than one bead wire core is to be produced, the tape is split into the appropriate number of individual tapes before being gripped in a former of the winding machine where it is wrapped as one, two or three beads simultaneously. Typically it will be wrapped in 4, 5 or 6 convolutions, each convolution being vertically stacked on top of the previous convolution, before being removed from the former.

The passing of a single tape through the back-up equipment before being split, together with the small number of vertically stacked convolutions has proven to be a satisfactory system for winding these kinds of weftless bead wire cores.

However, for single wire, programmed, hexagonal shaped bead wire cores for use in truck tyres, the same simple principles do not apply. These bead wire cores typically comprise about 70 or 80 convolutions of a single wire instead of the 4 to 6 convolutions of a tape in a weftless bead wire core. In addition each convolution of the single wire has to be positioned very accurately into a predetermined pattern, e.g. in the shape of a hexagonal or an off-set hexagonal cross-section, usually with a 15 degree base angle. This is very difficult to achieve in comparison to the simple vertical stacking of weftless bead wire tape.

Additionally, there are a large number of variations in the construction of truck bead wire cores, depending on the size, type and duty of the tyre.

When winding more than one bead wire core side by side and simultaneously, it is inevitable that, due to slight differences in cast and helix and diameter tolerances in the wire, together with unpredictable variations in rubber coating thickness and wire positioning in the bead construction, that the actual length of wire used may vary slightly between each of the bead wire cores being wound simultaneously.

Over even a small number of bead winding cycles, an accumulation of these small variations would affect the quality of the bead wire cores produced and render the bead line inoperable unless the operating system could adequately deal with the problem.

It is for this reason that single wire bead lines designed for producing hexagonal bead wire cores for truck or high performance motor car tyres are conventionally fitted with a separate pull-off and festooner assembly for each wire run.

A normal known single wire bead line is fitted with one pull-off and one festooner assembly and is used to build one bead wire core at a time. More recently it has been known to have high output bead lines which produce up to 6 single wire bead wire cores at a time. However, in order to operate properly, these bead lines have had to include a separate motorised pull-off and festooner assembly for each bead wire core produced, each assembly being separately driven by a D.C. or servomotor drive and separately controlled, e.g. by a computer control system.

The known existing machines that produce only one bead wire core at a time are expensive to buy and in labour costs per bead. Those machines producing multiple beads are very sophisticated but are expensive and only really viable for the largest tyre companies.

An aim of the present invention is to enable at least two single wire bead wire cores, e.g. hexagonal section bead wire cores, to be built at the same time using only a single pull-off and a single festoon assembly.

A further aim of the present invention is to provide apparatus which has an increased output over existing widely used single wire bead lines but which can be built relatively cheaply.

According to one aspect of the present invention a method of producing at least two single wire tyre bead cores comprising drawing off at least two bead wires from separate coils of wires, passing the wires through processing means to coat the drawn-off wires with rubber material, passing the rubber-coated wires through first festooner apparatus, preferably a single festooner apparatus, and subsequently winding the rubber-coated wires on a former to create at least two single wire tyre bead cores on the former, is characterised in that before the wires are passed through said first festooner apparatus they are joined together in said wire processing means, in that the joined together rubber coated wires are split after passing through said first festooner apparatus and in that the wires, after being split, are passed through second festooner apparatus before being wound on said former.

The wires, after being split, are individually tensioned in the second festooner apparatus to control their winding onto the former to compensate for variations in their lengths. Thus the apparatus is able to restrict any bead wire length variations to within the confines of the winding machine. Any such length variations can be measured against the specification of the bead being wound and either incorporated into, or removed from, the tyre bead cores during the final winding stage. In this way dual bead wires can be produced without an accumulation of loose bead wire appearing in the process line or the need for separate draw off means and festooner apparatus being included to accommodate it.

Conventionally it is necessary, for each bead wire, to have separate festooner apparatus and wire pull-off apparatus (which may be combined with the festooner apparatus). However in the method according to the present invention, the joining together of the bead wires to form a temporary single "tape" of bead wire, allows only a single festooner apparatus and pull-off apparatus to be used, before the "tape" is split into individual bead wires prior to winding. Thus only a single one of the costly first festooner apparatus needs to be provided. By individually tensioning the split wires in the second festooner apparatus before they are wound onto the former, variations in the wire lengths forming the different beads can be compensated for.

Preferably the wires, when passing through said wire processing means, are initially coated with the rubber material before they are pressed together. In this way the still tacky rubber coated wires are temporarily joined together until they are subsequently split or separated after passage through the first festooner apparatus.

According to another aspect of the present invention apparatus for producing at least two single wire tyre bead cores, the apparatus comprising at least two let off stands each containing a wound reel of bead wire, draw off means, preferably a single draw off means, for drawing bead wire from said reels, wire processing means between said draw off means and said let off stands including coating means for coating the bead wires with rubber material, winding means for winding rubber-coated bead wire onto a former to produce at least two single wire tyre bead cores and first festooner apparatus, preferably a single first festooner apparatus, positioned between the draw off means and the winding means, is characterised in that said wire processing means further includes joining means for joining together the rubber coated bead wires, in that splitter means are provided between the first festooner apparatus and the winding means to split the joined together bead wires into separate bead wires, and in that, between the splitter means and the former, a second festooner apparatus is provided for each split wire to compensate for length variations in the split bead wires when they are wound onto the former.

An embodiment of the invention will now be described, by way of example only, with particular reference to the accompanying drawings, in which.

Figure 3:
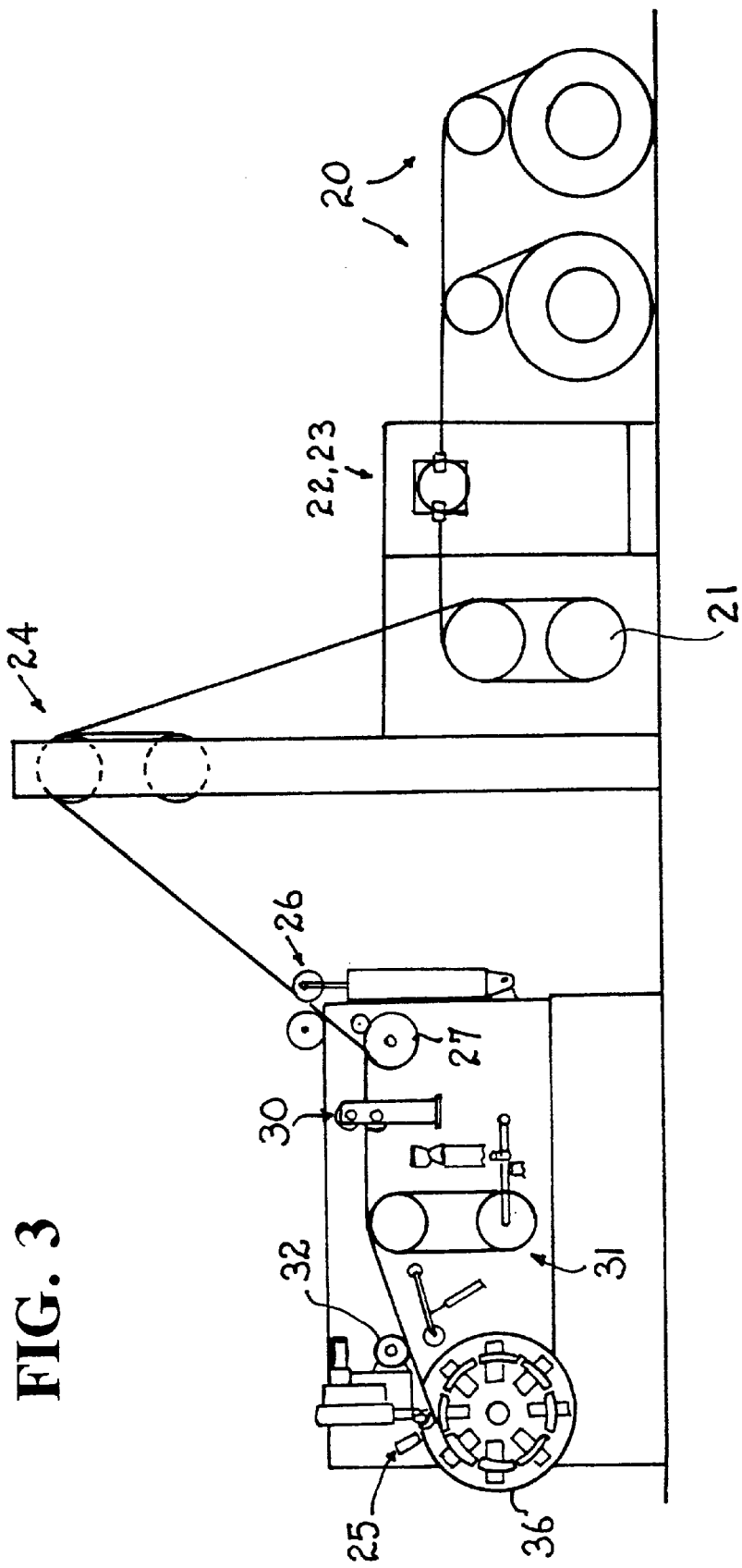
FIGS. 3 and 4 are a view from the side and a plan, respectively, of a dual wire bead line of the kind shown schematically in FIG. 2.
Figure 4:
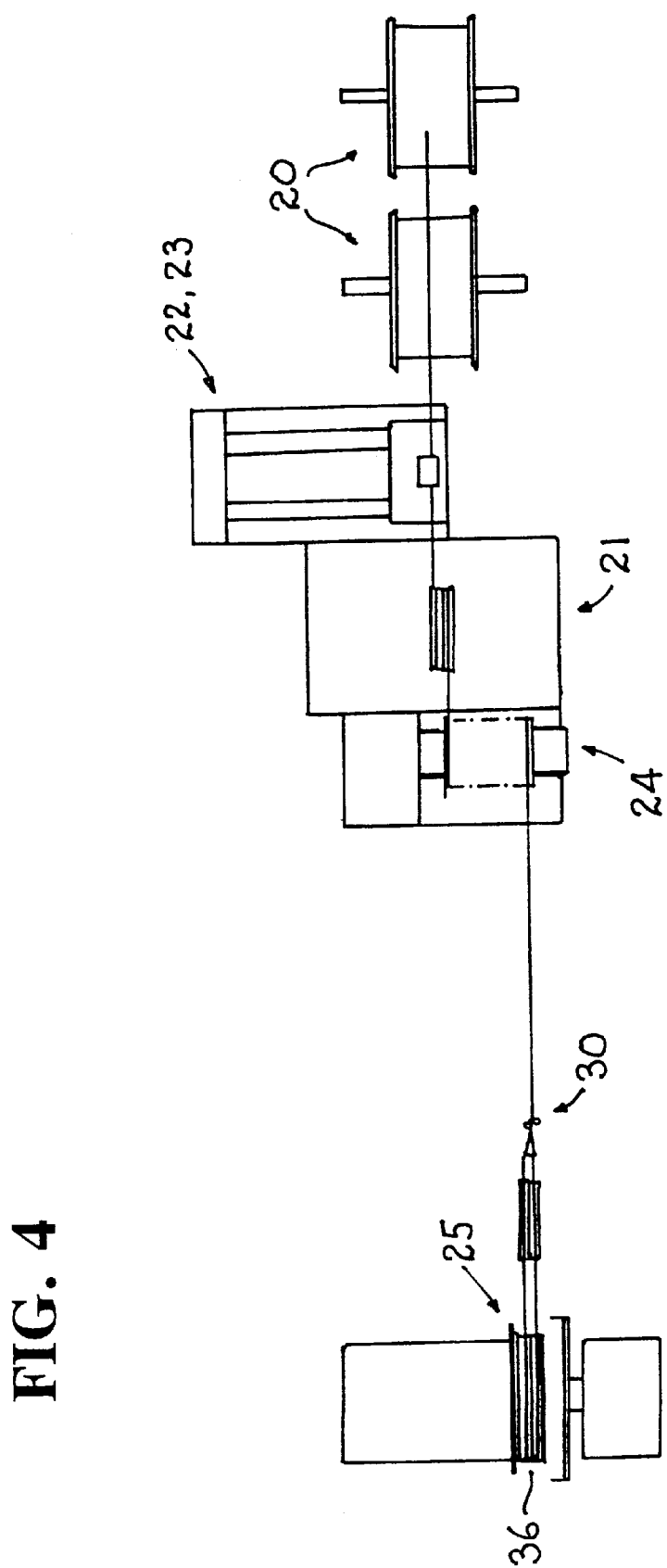
Figure 6:
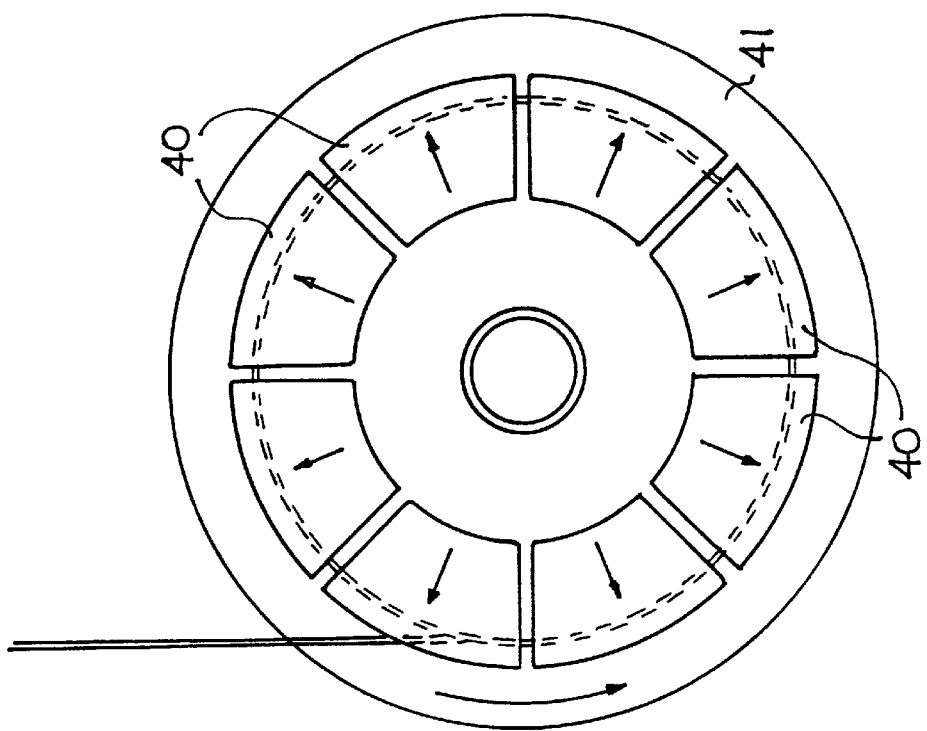
Figure 5:
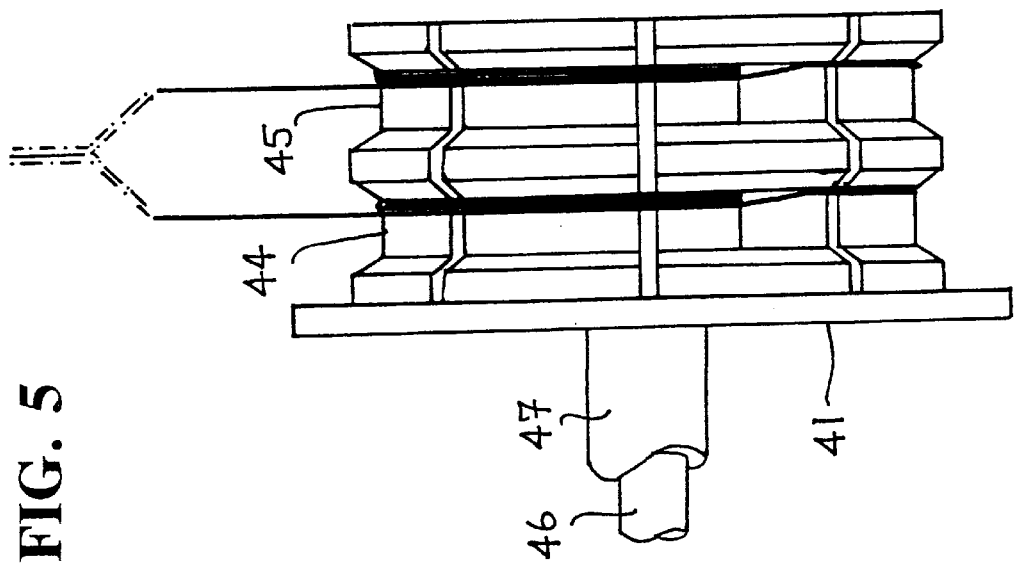
Figure 8:
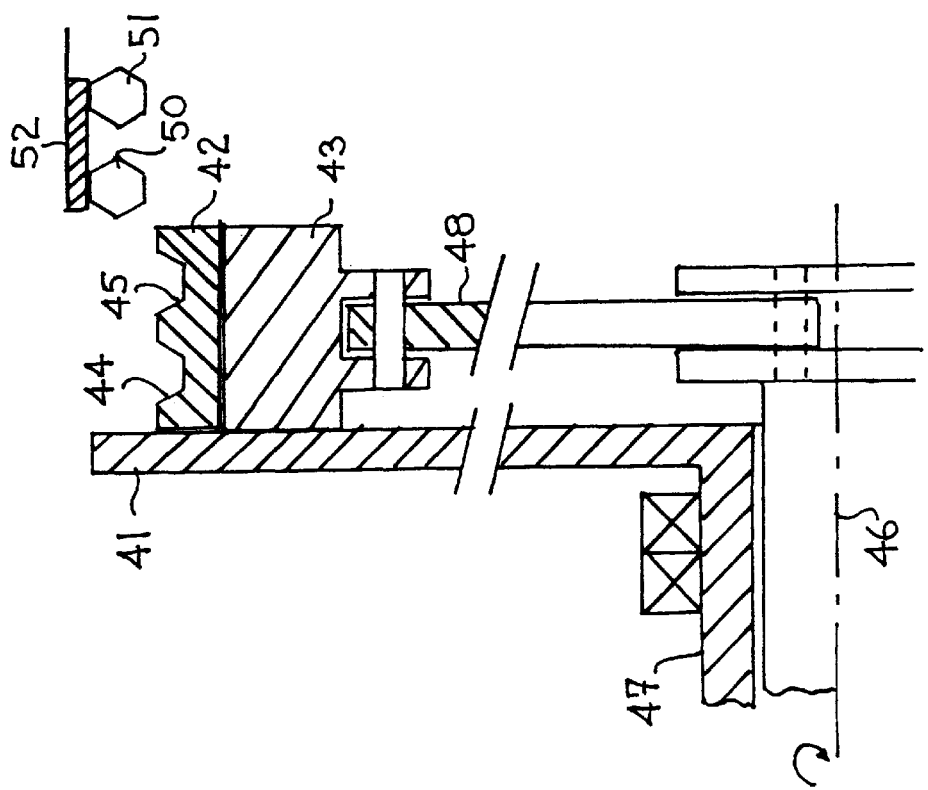
Figure 7:
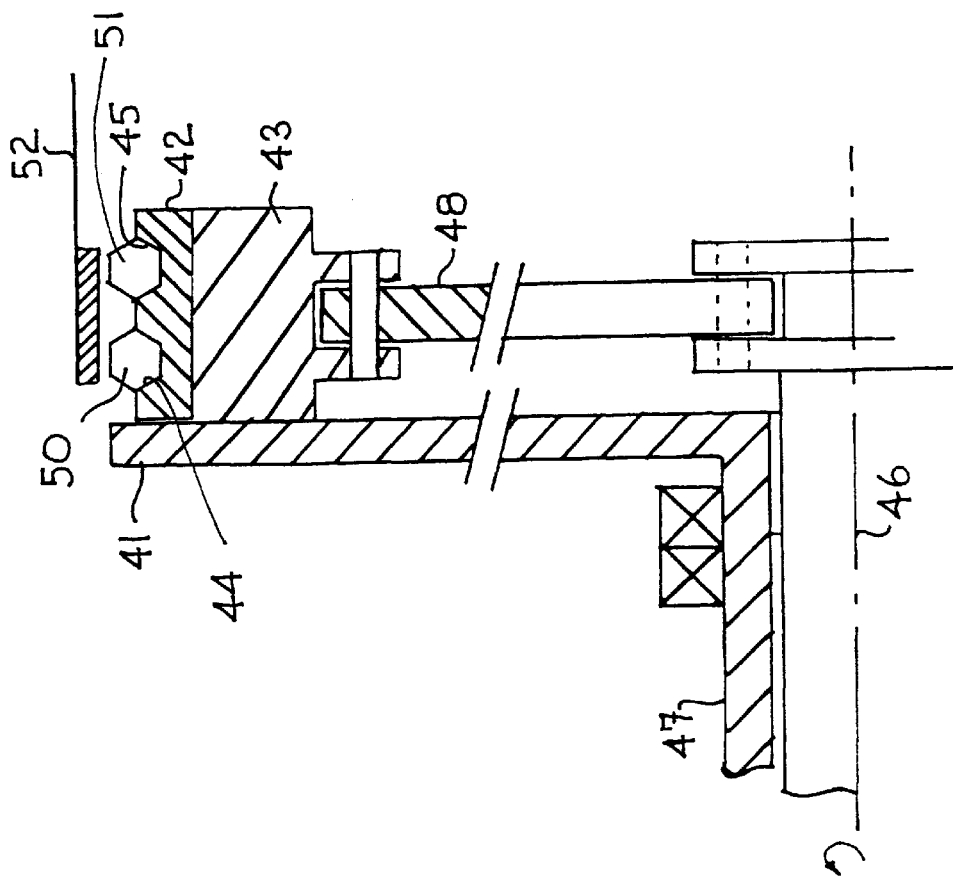

FIGS. 5 and 6 are views from one end, and from one side, respectively, of a winding drum of the bead line shown in FIGS. 3 and 4; and FIGS. 7 and 8 are schematic sectional views of the winding drum shown in FIGS. 5 and 6 during, respectively, winding of bead wires on, and unloading of bead wires from, the winding drum.

Figure 1:
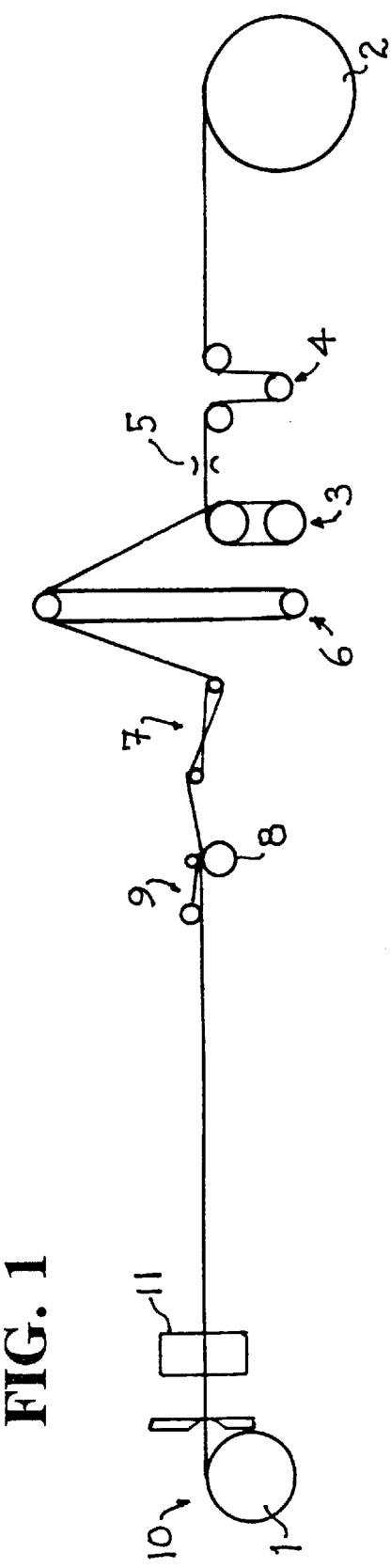
FIG. 1 is a schematic view of a known, single wire bead line.

FIG. 1 schematically shows a known single wire bead line for forming a single annular bead wire core on a former 1. In this known bead line, wire is drawn off a let-off stand 2 by pull-off drums 3. The drawn off wire is pre-heated in a heater 4 and is passed through an extruder 5 where it is coated with rubber. The sticky or tacky rubber-coated wire is fed through a festoon device 6, an anti-whip unit 7 and a no-back device 8 incorporating a pull-back arm 9 before being fed to a winding unit 10. In addition to the former 1, the winding unit 10 includes a pay-on head 11 having a stepper motor and a cutter 12.

In order to increase the capacity of this conventional bead line, it is known to wind more than one bead wire in the winding unit. However, this requires the use of separate let-off stands, heaters, pull-off drums, festoon assemblies and control systems for each bead wire, which considerably increases the cost and complexity of the bead line.

Figure 2:
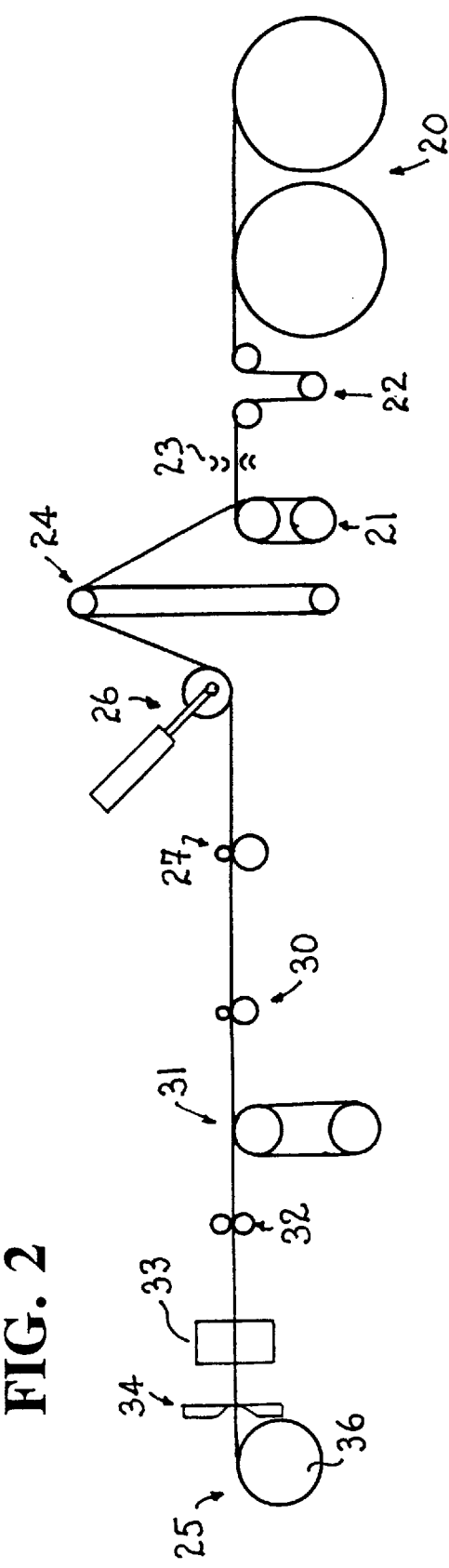
FIG. 2 is a schematic view of apparatus according to the invention in the form of a dual wire bead line.

In the bead line shown in FIG. 2, constructed in accordance with the invention, a pair of let-off stands 20 are provided. Pull-off drums 21 draw the wires from the stands 20 so that the wires are heated in heater 22 and passed through wire processing means including extruder means 23. In the extruder means 23, the two wires are coated with rubber material as individual wires in the usual way. These two wires will, however, immediately after being coated with rubber material be pressed together in the wire processing means so that the sticky rubber coatings will adhere together so that the rubber coated wires are joined together to form a single tape, generally in the form of a FIG. 8 in cross section. This single tape form will be retained from the extruder means across the pull-off drums 21, through sheaves of a single festooner apparatus 24 and into winding means 25.

The entry into the winding means 25 is firstly through a whip control mechanism 26, to allow for rapid stopping and starting, which is characteristic of the winding process, followed by passing through a no-back assembly in the form of a sheave and pressure roll arrangement 27 that incorporates a sprag clutch to avoid the possibility of the tape being drawn back out of the machine once it has passed this mechanism.

Up to this point the two coated wires are still in the form of the FIG. 8 single tape produced by pressing together the individual coated wires after the extrusion means 23.

After passing through the sprag bearing mechanism, the FIG. 8 tape passes through splitter means 30 where the two coated wires are once again separated into their individual components, that is, into two separate rubber coated steel bead wires. The splitter means 30 may be in the form of rotating splitting discs, a static hot knife or simply a blade that will part the wires at the point they have been pressed together. Alternatively, the splitter means may be incorporated into the design of the no-back assembly.

Following the splitter means 30, each wire passes through its own local tensioning festoon assembly 31 that takes up and measures any slack developing between the splitter means 30 and the former 36 of the winding means during each bead winding operation in either of the two wires.

A system of driven pressure rolls 32 is sited between the tensioning festoon assembly 31 and a wire positioning or laying-on head 33. Finally two wire cutters 34 are mounted between the laying-on head 33 and the former 36 to complete the system.

At the end of each bead winding cycle, depending upon the signals from the tensioning festoon, the wire excess is cut out and removed from the winding means or incorporated into the bead wire cores. If the wire excess in the local festoon is outside the bead overlap specification, both wires are cut simultaneously separating the beads from the feed stock with exactly the same overlap dimension. Next, the pressure roll system will transfer the excess from the tensioning festoon through the appropriate cutter which will cut out this excess leaving the two feedstock wire ends and the tensioning festooner ready for the next cycle. If the excess is within the bead specification one of two systems can be selected depending upon the customer preference.

In one system, immediately the winding cycle is completed and the former 36 has stopped, both bead wires are cut from the feedstock and the bead wire cores are removed.

The excess wire in the tensioning festoon is then transferred from the festoon through the cutters by the pressure roll system. The two unequal length leading wire ends are then placed in the former grip effectively transferring the variation into the following bead wire cores.

In the second system, when the beads have been wound and the former 36 has stopped, the wire without the excess is cut, the former is rotated slowly drawing the excess wire from the festoon, the former again stops and the second wire is cut, thus absorbing the excess into the end of the bead wire core just wound. This leaves the leading ends of the feed wires identically positioned for placing into the former grips for the next two beads.

Either arrangement will ensure that any variation in the length of the bead wire, in any pair of beads, is consistently included in these same beads or in the succeeding beads. The possibility of length variation accumulating back down the bead line will have been eliminated.

The former 36 is shown in more detail in FIGS. 5–8 and comprises a number, e.g. eight, of radially movable former segments 40 carried on a fixed faceplate 41. The segments 40 are movable radially inwardly and outwardly between inner positions (shown in FIG. 8) and outer positions (shown in FIG. 7). Each segment 40 comprises a replaceable bead shoe 42 carried on a shoe support 43, each bead shoe 42 having a pair of parallel, machined bead profile grooves 44, 45 for receiving the bead wire during winding of the two bead wire cores. The former segments 40 are moved radially inwardly and outwardly by means of a rotary shaft 46 which is carried within a hollow drive shaft 47. The rotary shaft 46 is connected to the shoe supports 43 by connecting rods 48 (only one of which is shown in FIGS. 7 and 8) which are pivotally connected between the shaft 46 and shoe supports 43.

During a winding operation, the former segments 40 are in their outer positions. On completion of the winding operation the shaft 46 is rotated relative to the hollow drive shaft 47 so that the former segments are moved radially inwards by the connecting rods 48 so as to adopt their inner positions as shown in FIG. 8. The wound bead wire cores 50 and 51 can then be removed automatically by a bead unloading device 52.

What is claimed is:

1. A method of producing at least two single wire tyre bead cores comprising the steps of drawing off at least two bead wires from separate coils (20) of wires, passing the wires through wire processing means (23) to form a single tape of bead wires embedded in surrounding rubber material, passing the bead wire tape through first festooner apparatus (24), splitting the bead wire tape and subsequently winding the split bead wire tape on a former (36) to create at least two bead cores on the former, wherein the step of splitting the bead wire tape splits the tape into separate rubber coated wires, and wherein the rubber coated wires, after being split, are passed through second festooner apparatus (31) before being wound on said former (36) to create at least two singe wire tyre bead cores.

2. A method according to claim 1, wherein the wires when passing through said wire processing means (23) are initially each coated with said rubber material and are then joined by pressing the rubber coated wires together to form said single tape of bead wires.

3. Apparatus for producing at least two tyre bead cores, the apparatus comprising at least two let off stands (20) each containing a wound reel of bead wire, draw off means (21) for drawing bead wires from said reels, wire processing means (23) between said draw off means (21) and said let off stands (20) including coating and joining means for coating the bead wires with rubber material and joining them together to form a single tape of bead wire embedded in surrounding rubber material, splitter means (30) for splitting the bead wire tape, winding means (25) for winding the split wire tape onto a former (36) to produce at least two tyre bead cores and first festooner apparatus (24) positioned between the draw off means (21) and the splitter means (30), wherein said splitter means (30) is arranged to split the bead wire tape into separate rubber coated bead wires, and wherein, between the splitter means (30) and the former (36), a second festooner apparatus (31) is provided for each split rubber coated wire to compensate for length variations in the split bead wires when they are wound onto the former (36) to create at least two single wire tyre bead cores.

\* \* \* \* \*